UNITED STATES PATENT OFFICE.

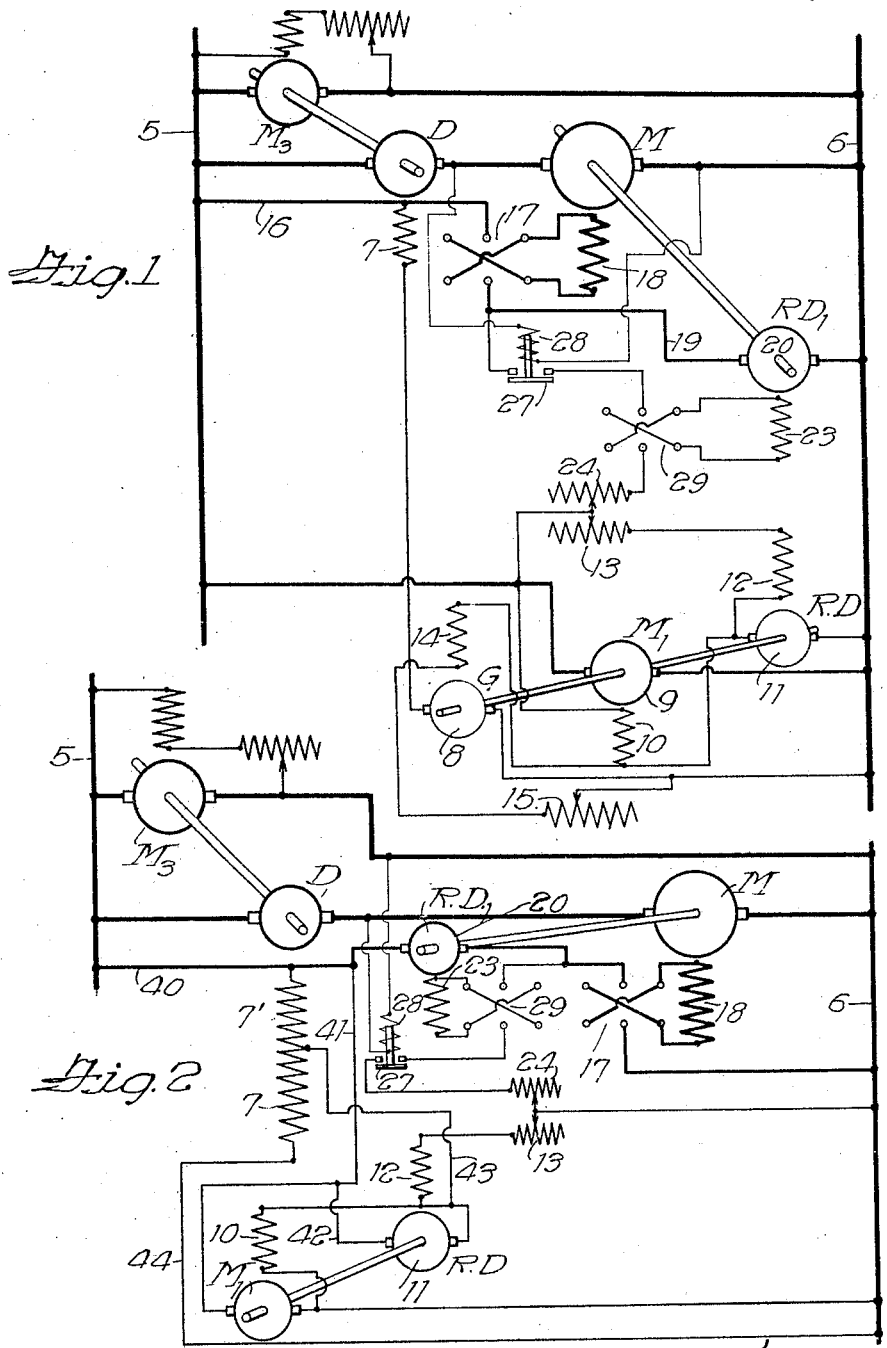

LEIGH J. STEPHENSON, OF CHICAGO, ILLINOIS, ASSIGNOR TO WILLIAM T. FENTON, BENJAMIN V. BECKER, LYNN A. WILLIAMS, GEORGE B. BURRAGE, AND LEIGH J. STEPHENSON, TRUSTEES, ALL OF CHICAGO, ILLINOIS.

MOTOR-CONTROL SYSTEM.

1,411,309. Specification of Letters Patent. Patented Apr. 4, 1922.

Application filed November 28, 1919. Serial No. 341,247.

*To all whom it may concern:*

Be it known that I, LEIGH J. STEPHENSON, a citizen of the United States, residing at Chicago, in the county of Cook and State of Illinois, have invented a certain new and useful Improvement in Motor-Control Systems, of which the following is a full, clear, concise, and exact description, reference being had to the accompanying drawings, forming a part of this specification.

My invention relates to improvements in motor control and is especially concerned with the provision of novel means for controlling the operation of motors designed for operating mill rolls, hoists, etc., wherein the motors are driven directly from a source of direct current, a dynamo being connected in series with the motor and controlled in such a manner that during the initial portion of the accelerating period of the motor the dynamo opposes the potential of the source of current supplying current to the motor, and during the subsequent period of acceleration adds its voltage to that of the source of supply so as to increase the potential applied to the motor terminals any desired amount above the potential of the source of supply.

The objects of my invention are:

First: To provide means of the character described whereby the motor can be rapidly and smoothly accelerated and held at any desired speed;

Second: To provide means for controlling a motor whereby it can be caused to function exactly like a series motor or if desired, can be caused to accelerate like a series motor but which will have a constant top speed;

Third: To provide a motor control of simple construction by means of which the speed of the motor can be quickly reduced through regenerative braking;

Fourth: To provide means for controlling the operation of the motor which will require a minimum number of switches and which is otherwise simple in construction, economical to manufacture and easy to operate.

Other objects will appear as this description progresses, reference being had to the accompanying drawings in which Figure 1 is a diagrammatical sketch of the apparatus and electrical connections comprising my improved motor control; and Figure 2 is a similar view of a modified form of my invention.

In my Patent, Number 1,322,471 of November 18, 1919, I have described a dynamo electric machine comprising a motor having a field winding, a regulating dynamo connected in series with the motor field winding to form a field winding circuit, and means for impressing a potential upon said field winding circuit in a direction to oppose the counter-electromotive force of the regulating dynamo. The regulating dynamo is mechanically connected with the motor so as to rotate at a speed constantly proportional to the speed of the motor. The field winding of the regulating dynamo is connected with the field winding of the motor in such a manner as to maintain a constant ratio between the currents flowing in these two field windings. A rheostat is connected with the field winding of the regulating dynamo by means of which the ratio of the currents flowing in the field winding of the motor and the field winding of the regulating dynamo can be varied as desired to control the operation of the motor.

One of the objects of my present invention is to take advantage of the peculiar characteristics of the dynamo electric machine described in my above mentioned patent to adapt it to the system of motor control referred to above, whereby considerable economies are effected in the mechanism required to control the motors of the main rolls of steel mills, hoists, and other apparatus requiring motors of similar characteristics, and by means of which regenerative braking can be easily and efficiently effected.

Referring to the drawings, the reference character M indicates the motor designed to be used for driving the various kinds of apparatus above referred to, which is supplied with current from the direct current mains 5 and 6. Connected in series with the motor M is a dynamo D driven at a constant speed by a motor $M_3$, connected directly across the lines 5 and 6. The motor M is so designed that its normal voltage is twice that of the lines 5 and 6, and the dynamo D is so designed that its maximum voltage is equal to the voltage of the lines 5 and 6. I provide means, which I shall shortly describe in detail, for causing the dynamo D to initially generate a voltage equal to line voltage, but in a direction opposing line voltage so that the resultant voltage impressed upon the terminals of the motor M will be zero. I also provide means for subsequently gradually but rapidly decreasing the voltage of the dynamo D until it reaches a zero value, and for then reversing the direction of the voltage of the dynamo D and gradually but rapidly increasing its voltage in the reversed direction until its generated voltage is substantially equal to that of the line and added to that of the line. By means of this apparatus I am enabled to gradually but rapidly increase the voltage applied to the terminals of the motor from zero to substantially twice line voltage, thereby causing it to rapidly accelerate. I also provide means for initially fully exciting the fields of the motor so as to provide a strong starting torque, and means for subsequently causing a rapid decrease in the field strength of the motor whereby due to this additional cause, its speed will rapidly increase, this means being controlled by the voltage impressed upon the motor armature terminals.

I shall now describe in detail the means by which I cause the voltage of the dynamo D to decrease from the maximum value to zero then reverse and build up in the opposite direction to its maximum. The dynamo D is provided with a field winding 7 which is connected in series with the armature 8 of the generator G to form a field winding circuit which is connected directly across the lines 5—6, as shown. The generator G is driven by a motor $M_1$, the armature 9 of which is connected directly across the lines 5—6. The field winding 10 of the motor $M_1$ is connected in series with the armature 11 of the regulating dynamo RD to form a field winding circuit which is likewise connected across the lines 5—6. The regulating dynamo RD is provided with a field winding 12 which is connected in parallel with the field winding 10 of the motor $M_1$, the current through the field winding 12 being controlled by an adjustable rheostat 13. The field winding 14 of the generator G is connected around or in parallel with the armature 11 of the regulating dynamo RD. An adjustable rheostat 15 is connected in series with the field winding 14 of the generator merely for the purpose of adjusting the voltage of the generator G, and is not used for control purposes, that is, after once being set to produce a desired operation, it is thereafter undisturbed.

When the adjustable rheostat 13 is adjusted so as to open the field circuit of the regulating dynamo RD the generated voltage of the regulating dynamo will be substantially zero and consequently no current will flow through the field winding 14 of the generator G and its voltage will be substantially zero. There is, therefore, nothing to oppose the flow of current through the field winding 7 of the dynamo D and its field winding will be fully excited. Since the dynamo D is operating at a constant speed, it will be generating its highest potential. This potential opposes the line voltage and consequently reduces the potential applied to the terminals of the motor M to substantially zero. At this time the field of the motor M will be fully excited through the following circuit: line wire 5, conductor 16, reversing switch 17, field winding 18, conductor 19, armature 20 of regulating dynamo $RD_1$, to line wire 6. If the adjustable resistance 13 is now actuated to cut out all of its resistance so as to permit a maximum flow of current through the field winding 12 of the regulating dynamo RD, two things are accomplished. In the first place, the counter-electromotive force of the regulating dynamo will rapidly increase and since this counter-electromotive force opposes the flow of current through the motor field winding 10, the motor $M_1$ will be caused to correspondingly rapidly accelerate, thereby causing the armature of the generator G to accelerate rapidly. In the second place the generated voltage of the regulating dynamo RD will, as stated, rapidly increase and cause a corresponding rapid increase in the flow of current through the field winding 14 of the generator G. The rapid acceleration of the speed of the armature of the generator G and the rapid increase in its field strength will cause a corresponding rapid increase of its voltage, and since this voltage opposes the voltage impressed on the field winding 7 of the dynamo D, the current flowing through this field winding will be rapidly decreased and effect a corresponding reduction in the potential of the dynamo D. Inasmuch as the dynamo D opposes the line voltage, any decrease in the potential of the dynamo D will cause a corresponding increase in the potential applied to the terminals of the motor M, and thereby cause it to accelerate.

As the speed of the motor $M_1$ increases, a point will be reached where the potential of the generator G will equal that of the line, and as a result no current will flow through the field winding 7 and the potential of the dynamo D will be substantially zero. At this point full line voltage is being impressed upon the terminals of the motor M.

As the motor $M_1$ continues to increase in speed, the voltage of the generator G will rise above line voltage and cause current to flow through the field winding 7 of the dynamo D in a direction opposite to that in which the current initially flowed through this winding, thereby reversing the direction of the potential of the dynamo D so that its potential is now added to the line potential, thereby causing a still further increase in the speed of the motor M. The motor $M_1$ continues to increase in speed until the generator G is generating substantially twice line voltage, thereby causing the dynamo D to generate substantially full line voltage. Since the voltage of dynamo D is added to line voltage, this means that substantially double line voltage is being impressed upon the terminals of the motor M.

Having thus described the means which I employ for controlling the potential applied to the terminals of the motor M, I shall now describe the means by which I control the field strength of the motor M.

The motor M is provided with a field winding 18 which is connected in series with the armature 20 of the regulating dynamo $RD_1$ through a reversing switch 17 to form a field winding circuit for the motor M, which is connected directly across the lines 5—6. The counter-electromotive force of the regulating dynamo $RD_1$ is opposed to the potential impressed on the field winding circuit by the lines 5—6, so that as its counter-electromotive force increases, the current flowing through the field winding 18 will be correspondingly decreased.

The regulating dynamo $RD_1$ has a field winding 23 which is connected in parallel with the field winding 18 of the motor M, so as to maintain a constant ratio between the currents flowing in the motor field winding 18 and the regulating dynamo field winding 23. This ratio can be varied by means of the adjustable rheostat 24 which is connected in series with the field winding 23. The circuit of the field winding 23 includes a solenoid-operated switch 27 the solenoid 28 of which is connected directly across the terminals of the motor M. The circuit of the field winding 23 also contains a reversing switch 29.

The switch 27 is so designed that it will close when the potential across the terminals of the motor M has reached any predetermined desired value, whereupon current will flow through field winding 23 of the regulating dynamo $RD_1$, causing its potential to rapidly increase and since the counter-electromotive force of this regulating dynamo opposes the potential impressed upon the field winding 18 of the motor, there will be a corresponding rapid decrease in the field strength of the motor M, causing it to accelerate. This causes the regulating dynamo $RD_1$ to accelerate at the same rate and increase its voltage, thereby causing a substantial decrease in the field strength of the motor M and a further increase in the speed of the motor. This cycle continues until the motor reaches its top speed, which is determined by the relative designs of the motor M and the regulating dynamo $RD_1$, as explained in my patent referred to above.

When it is desired to stop the motor, the adjustable resistances 13 and 24 are actuated to gradually include their resistances in the circuits in which they are connected. After the resistance of the rheostat 13 is included in the circuit of the field winding 12, the field strength and consequently the voltage of the regulating dynamo RD will decrease, thereby causing an increase in the current flowing in the field winding 10 of the motor $M_1$ and a decrease of the current flowing in the field winding 14 of the generator G. By increasing the field strength of the motor $M_1$ its speed is reduced, as is also the speed of the generator G, and the regulating dynamo RD. Due to the combined weakening of the field of the generator G and the reduction in the speed of its armature, its voltage will rapidly decrease thereby causing a rapid decrease in the field strength of the dynamo D and a corresponding reduction in its potential.

At the same time that the effects resulting from the weakening of the field of the regulating dynamo take place, the field strength of the dynamo $RD_1$ is being decreased by reason of the inclusion of resistance 24 in its field winding circuit. This decrease in the field strength of the regulating dynamo $RD_1$ results in an increase in the field strength of the motor M and a corresponding increase in its potential, thereby raising its potential above the combined potentials of the line and the dynamo D, causing the dynamo D to function as a motor to drive the motor $M_3$ as a generator to return current to the line.

As the resistances 13 and 24 are continuously cut into their respective circuits, the actions just described continue until the potential applied to the solenoid 28 of the switch 27 decreases to such an extent that this switch opens, thereby reducing the field and consequently the counter-electromotive force of the regulating dynamo $RD_1$ to zero and bringing the field strength of the motor M to a maximum. The point is also reached where the voltage of the generator G just equals the line voltage and the field of the dynamo D is reduced to zero. The field is then reversed by a continued decrease in the voltage of the generator G, so that its generated voltage now beings to oppose line voltage. The reduction in the potential applied to the motor terminals due to the opposing action of the dynamo D and the increase in the generated voltage of the motor M, due to its increase in field strength, will tend to maintain the voltage of the motor M at a value greater than the algebraic sum of the dynamo voltage and the line voltage, thereby causing the motor M to continue to act as a generator and return current to the line until the motor is brought to practically a standstill.

Because during regeneration the algebraic sum of the line voltage and the potential of the dynamo D is constantly diminishing at substantially the same rate that the motor generated voltage decreases, the current returned to the line by the motor will remain substantially constant.

To reverse the direction of rotation of the Motor M, it is merely necessary to operate the reversing switches 17 and 29, respectively.

The construction illustrated in Figure 2 is substantially the same as that shown in Figure 1, except that the generator G is dispensed with and the dynamo D is provided with a double field winding so arranged and connected that during the first portion of the acceleration period the current will flow through one half of the field winding to cause the voltage of the dynamo D to oppose line voltage, and during the remaining portion of the acceleration, current will flow through the other half of the dynamo field winding in such a direction as to cause the dynamo D to generate a voltage in phase with line voltage.

In this construction the motor $M_1$ is connected with the regulating dynamo RD in the same manner as in Figure 1 and the regulating dynamo RD controls the speed of the motor $M_1$ in the same manner as in Figure 1. The dynamo D, as described above, has two opposed field windings 7 and 7', respectively. The two field windings 7 and 7' are connected in series and directly across to the line. The armature of the regulating dynamo RD is connected in parallel with the field winding 7'.

With current applied to the line wires 5 and 6 and the adjustable rheostats 13 and 24 adjusted to open the respective circuits in which they are connected, the voltage of the regulating dynamo RD will be substantially zero and consequently current will flow from the line 5 through the conductors 40, 41 and 42, through the regulating dynamo RD, conductor 43, field winding 7 and conductor 44 to line 6, the current choosing the path through the regulating dynamo RD, in preference to the field winding 7', because of the low resistance of the former path and comparatively high resistance of the latter. When, however, the rheostat 13 is actuated to close the field winding circuit of the regulating dynamo RD and the resistance 13 is cut out, the motor $M_1$ and the regulating dynamo RD will rapidly accelerate for the reasons stated in connection with Figure 1, and cause a corresponding rapid increase in the counter-electromotive force of the regulating dynamo RD. This increase in the counter-electromotive force of the regulating dynamo RD will offer a rapidly increasing opposition to the passage of current through it to the field winding 7, and cause a corresponding increase in the flow of current through the field winding 7' until when the regulating dynamo RD is generating half line voltage the currents flowing in the field windings 7' and 7 will be equal, and the voltage of the dynamo D will be reduced to zero. As the speed and counter-electromotive force of the regulating dynamo RD continue to increase, the current in the field winding 7 will be still further diminished and the current in the field winding 7' increased until the counter-electromotive force of the regulating dynamo RD reaches its maximum value, at which time there will be substantially no current flowing in the field winding 7 and full current flowing in the field winding 7', thereby causing the dynamo D to add its full potential to the line voltage, as a result of which double the line voltage is applied to the terminals of the motor M just the same as in Figure 1.

It is believed unnecessary to describe the remaining features of the construction illustrated in Figure 2 for the reason that they are the same as those illustrated in Figure 1, and operate in exactly the same manner. In stopping the motor, the rheostats 13 and 24 are actuated as in Figure 1 to gradually include the resistances 13 and 24 in the respective circuits, whereby the counter-electromotive force of the regulating dynamo RD is gradually decreased and the field strength of the motor $M_1$ gradually increased, so as to cause a reduction in the generated voltage of the dynamo D. Likewise the counter-electromotive force of the regulating dynamo $RD_1$ is reduced when the circuit through the relay 27 is opened, causing a strengthening of the field 18 of the motor M, with the consequent return of power to the line, as described in connection with Figure 1.

While I have described the details of the preferred embodiments of my invention, it is to be clearly understood that my invention is not limited to these details, but is capable of other adaptations and modifications within the scope of the appended claims.

Having described my invention, what I claim as new is:

1. The combination with a power motor of a dynamo connected in series with said power motor, a second motor for driving said dynamo at a substantially constant speed, a field winding for said dynamo, a generator connected in series with said field winding to form a field winding circuit, means for impressing a potential upon said field winding circuit in a direction to oppose the voltage of said generator, a third motor for driving said generator, a field winding for said third motor, a regulating dynamo connected in series with said third motor field winding to form a field winding circuit, means for impressing a potential upon said last-named field winding circuit in a direction to oppose the counter-electromotive force of said regulating dynamo, driving connections between said motor and said generator and regulating dynamo whereby said generator and regulating dynamo operate at speeds constantly proportional to the speed of said third motor, a field winding for said generator connected across the armature of said regulating dynamo, a field winding for said regulating dynamo connected with said third motor field winding so as to maintain a constant ratio between the currents flowing in said two last mentioned field windings, means for varying said ratio, a field winding for said power motor, a second regulating dynamo connected in series with said power motor field winding to form a third field winding circuit, means for impressing a potential upon said third field winding circuit in a direction to oppose the counter-electromotive force of said second regulating dynamo, a field winding circuit for said second regulating dynamo connected with the field winding of said power motor in such a manner as to maintain a constant ratio between the currents flowing in said last mentioned field winding circuit and said power motor field winding, the said last mentioned field winding circuit comprising a switch, an adjustable rheostat for controlling the flow of current in said second regulating dynamo field circuit, means for causing said second regulating dynamo to rotate at a speed constantly proportional to the speed of said power motor, and means controlled by the voltage applied to said power motor terminals for controlling the operation of said switch.

2. The combination with a power motor of means for supplying current to said motor, a dynamo connected in series with said motor, a field winding for said dynamo, a generator connected in series with said field winding to form a field winding circuit, means for impressing a potential on said field winding circuit in a direction opposite to the voltage of said generator, the maximum voltage of said generator being greater than said impressed potential, means for causing the voltage of said generator to rapidly increase to its maximum value comprising a field winding for said generator, a regulating dynamo, the field winding of said generator being connected across said regulating dynamo, and means for causing the voltage of said regulating dynamo to rapidly increase, and other means for causing said power motor to rapidly accelerate comprising a field winding for said power motor, a regulating dynamo connected in series with said power motor field winding to form a power motor field winding circuit, means for impressing a potential on said power motor field winding circuit in a direction to oppose the counter-electromotive force of said regulating dynamo, a switch in said power motor field winding circuit, and means for causing said switch to be controlled by the voltage impressed on said power motor terminals.

3. The combination with a power motor of means for supplying current to said motor, a dynamo connected in series with said motor, a field winding for said dynamo, a generator connected in series with said field winding to form a field winding circuit, means for impressing a potential on said field winding circuit in a direction opposite to the voltage of said generator, the maximum voltage of said generator being greater than said impressed potential, means for causing the voltage of said generator to rapidly increase to its maximum value comprising a field winding for said generator, a regulating dynamo, the field winding of said generator being connected across said regulating dynamo, and means for causing the voltage of said regulating dynamo to rapidly increase, and other means for causing said power motor to rapidly accelerate after the voltage of said generator has increased to a value greater than the potential impressed on said dynamo field winding circuit.

4. The combination with a power motor of means for supplying current to said motor, a dynamo connected in series with said motor, a field winding for said dynamo, a generator connected in series with said field winding to form a field winding circuit, means for impressing a potential on said field winding circuit in a direction opposite to the voltage of said generator, the maximum voltage of said generator being greater than said impressed potential, means for causing the voltage of said generator to rapidly increase to its maximum value, and other means for causing said power motor to rapidly accelerate after the voltage of said generator has increased to a value greater than the potential impressed on said dynamo field winding circuit.

5. The combination with a power motor of means for supplying current to said motor, a dynamo connected in series with said motor, a field winding for said dynamo, a generator connected in series with said field winding to form a field winding circuit, means for impressing a potential on said field winding circuit in a direction opposite to the voltage of said generator, the maximum voltage of said generator being greater than said impressed potential, means for causing the voltage of said generator to rapidly increase to its maximum value, and other means for causing said power motor to rapidly accelerate comprising a field winding for said power motor, a regulating dynamo connected in series with said power motor field winding to form a power motor field winding circuit, means for impressing a potential on said power motor field winding circuit in a direction to oppose the counter-electromotive force of said regulating dynamo, a switch in said power motor field winding circuit, and means for causing said switch to be controlled by the voltage impressed on said power motor terminals.

6. The combination with a motor of a source for supplying current to said motor, a dynamo connected in series with said motor, a field winding for said dynamo, means for causing current to initially flow through said field winding in one direction and subsequently in the other direction whereby said dynamo first opposes the potential impressed on said motor terminals and subsequently adds its potential to the potential of said source, a field winding for said motor, means for supplying current to said field winding, means for reducing the flow of current in said field winding, and means for causing said last-named means to become operative only after the flow of current through said dynamo field winding has reversed.

7. The combination with a motor having a field winding, of means for supplying current to said motor, a dynamo connected in series with said motor, means for reversing the direction of the generated voltage of said dynamo, means for supplying current to the field winding of said motor, and means controlled by the potential applied to said motor terminals for reducing the supply of current to said motor field winding.

8. The combination with a motor of means for impressing a gradually increasing voltage upon the terminals thereof, and means controlled by the potential impressed on said motor terminals for decreasing the field strength of said motor after the potential applied to its terminals has reached a predetermined value.

9. The combination with a motor of means for impressing a gradually increasing voltage upon the terminals thereof, and means controlled by the potential impressed on said motor terminals for decreasing the field strength of said motor.

10. The combination with a dynamo having a field winding, of a generator connected in series with said winding to form a field winding circuit, means for impressing a potential on said field winding circuit in a direction to oppose the voltage of said generator, the maximum voltage of said generator being greater than the potential impressed on said field winding circuit, and means for rapidly accelerating said generator, comprising a motor having a field winding, a regulating dynamo connected in series with said field winding to form a field winding circuit, and means for impressing a potential on said field winding circuit in a direction to oppose the counter-electromotive force of said regulating dynamo.

In witness whereof, I hereunto subscribe my name this 26th day of November, 1919.

LEIGH J. STEPHENSON.

Witnesses:
 ANDREW WINTERCORN,
 EDNA V. GUSTAFSON.